United States Patent
Chen

(10) Patent No.: US 10,876,707 B2
(45) Date of Patent: Dec. 29, 2020

(54) PATTERN PROJECTION DEVICE

(71) Applicant: Young Optics Inc., Hsinchu (TW)

(72) Inventor: S-Wei Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 54 days.

(21) Appl. No.: 16/248,779

(22) Filed: Jan. 16, 2019

(65) Prior Publication Data

US 2020/0141554 A1 May 7, 2020

(30) Foreign Application Priority Data

Nov. 2, 2018 (TW) .............................. 107139071 A

(51) Int. Cl.
| | | |
|---|---|---|
| *F21V 5/00* | (2018.01) | |
| *F21V 5/04* | (2006.01) | |
| *F21Y 105/16* | (2016.01) | |
| *F21Y 115/10* | (2016.01) | |

(52) U.S. Cl.
CPC .............. *F21V 5/004* (2013.01); *F21V 5/04* (2013.01); *F21Y 2105/16* (2016.08); *F21Y 2115/10* (2016.08)

(58) Field of Classification Search
CPC .... G03B 21/14; G03B 21/145; G03B 21/204; G03B 21/2013; G03B 21/2033; G03B 21/2066; F21V 5/00; F21V 5/002; F21V 5/004; F21V 5/005; F21V 5/007; F21V 5/04; F21V 5/043
See application file for complete search history.

(56) References Cited

U.S. PATENT DOCUMENTS

| | | | | |
|---|---|---|---|---|
| 2004/0136202 | A1* | 7/2004 | Ishida | F21S 41/148 362/521 |
| 2015/0267878 | A1* | 9/2015 | Daniels | F21K 9/61 362/553 |
| 2016/0290583 | A1* | 10/2016 | Suwa | F21S 41/43 |
| 2016/0327235 | A1* | 11/2016 | Khrushchev | G02B 3/0062 |
| 2016/0347237 | A1* | 12/2016 | Bhakta | F21S 41/285 |
| 2017/0175968 | A1* | 6/2017 | Shimizu | G03H 1/0248 |
| 2017/0241606 | A1* | 8/2017 | Courcier | F21S 41/141 |
| 2018/0188641 | A1* | 7/2018 | Chen | G03B 21/2033 |

FOREIGN PATENT DOCUMENTS

| | | |
|---|---|---|
| CN | 1767969 A | 5/2006 |
| CN | 101018693 A | 8/2007 |
| CN | 101887666 B | 7/2012 |
| CN | 106461181 A | 2/2017 |
| CN | 107300146 A | 10/2017 |
| CN | 107403591 A | 11/2017 |

* cited by examiner

*Primary Examiner* — Sultan Chowdhury

(57) ABSTRACT

A pattern projection device includes a matric-type light source, an image lens and a lampshade. The matric-type light source is composed of a plurality of light-emitting elements for emitting image light with a pattern. The image lens is located downstream of optical path of the matric-type light source, and the image lens includes a lens with refractive power and an anamorphic optical element. The lampshade is located downstream of the optical path of the anamorphic optical element. The anamorphic optical element is selected from the group consisting of a cylindrical lens, a biconic lens, a lenticular lens, a wedge lens, a wedge plate or a combination thereof.

19 Claims, 7 Drawing Sheets

PATTERN PROJECTION DEVICE

This application claims the benefit of Taiwan application Serial No. 107139071, filed Nov. 2, 2018, the subject matter of which is incorporated herein by reference.

BACKGROUND OF THE INVENTION

Field of the Invention

The invention relates in general to a pattern projection device, and more particularly to a pattern projection device having matric-type light source.

Description of the Related Art

A length-width ratio of a projected image of a current projection device is the same as that of a matric-type light source. It is required for different length-width ratio to replace the matric-type light source by different matric-type light source, which is very inconvenient. Based on this, there is a need to propose a new projection device capable of improving the aforementioned problems.

SUMMARY OF THE INVENTION

This disclosure is directed to a pattern projection device to resolve the conventional problems.

According to one embodiment of the invention, a pattern projection device for transportation vehicle includes a matric-type light source, an imaging lens and a vehicle lampshade. The matric-type light source includes a plurality of light-emitting elements configured to emit an image light with a pattern. The imaging lens is located downstream of optical path of the matric-type light source and includes an anamorphic optical element and a lens having a refractive power. The vehicle lampshade is located downstream of optical path of the anamorphic optical element. The anamorphic optical element is selected from the group consisting of a cylindrical lens, a biconic lens, a lenticular lens, a wedge lens, a wedge plate or a combination thereof.

According to one embodiment of the invention, a pattern projection device for transportation vehicle includes a matric-type light source, an imaging lens and a vehicle lampshade. The matric-type light source is configured to emit a first light beam having a pattern and includes a plurality of self-luminous elements. The imaging lens is located downstream of optical path of the matric-type light source and at least includes an anamorphic optical element and an lens having a refractive power, wherein the anamorphic optical element is selected from the group consisting of a cylindrical lens, a biconic lens, a lenticular lens, a wedge lens, a wedge plate or a combination thereof. The first light beam passing through the imaging lens becomes a second light beam, and the second light beam has a length-width ratio less than or equal to 0.5 in an imaging plane.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1A:
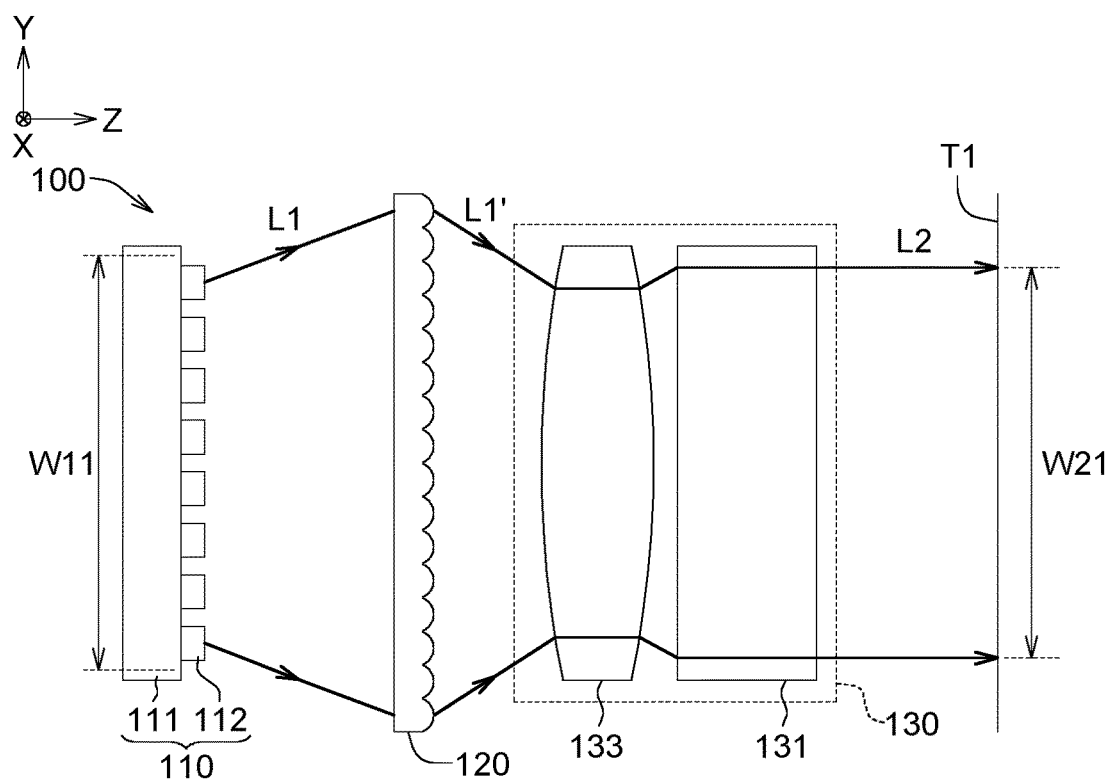
FIGS. 1A and 1B are schematic diagrams of a pattern projection device according to an embodiment of the present invention.
Figure 1B:
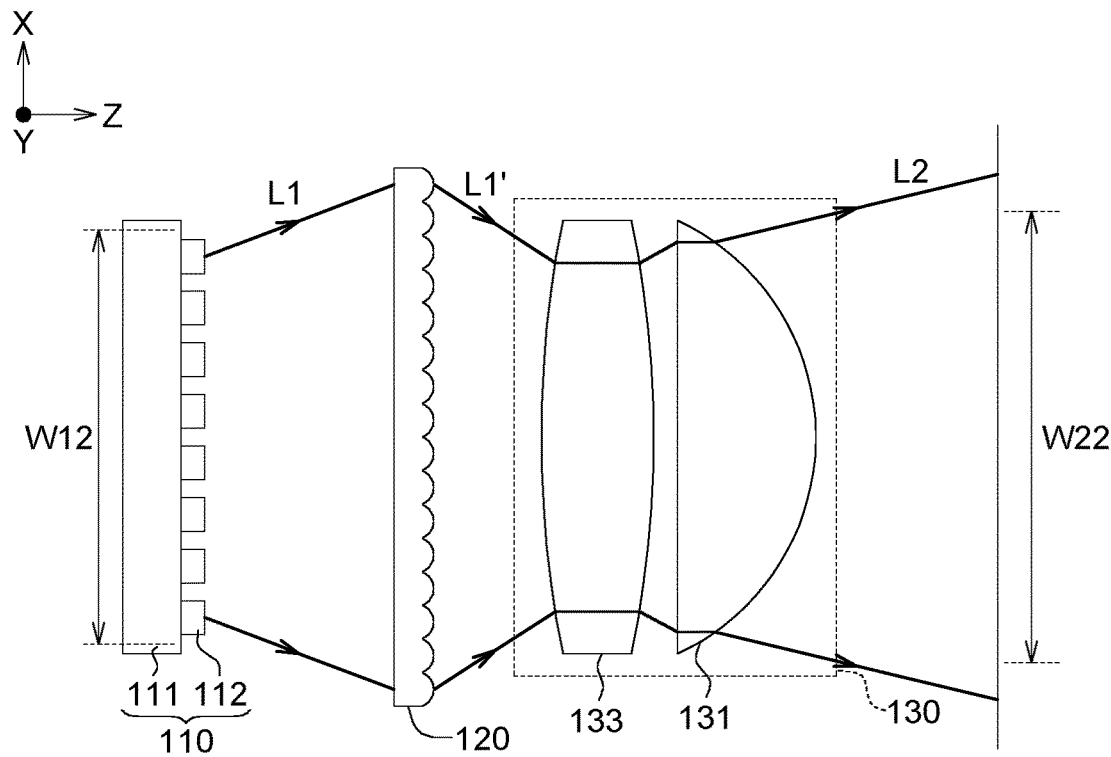
Figure 1C:
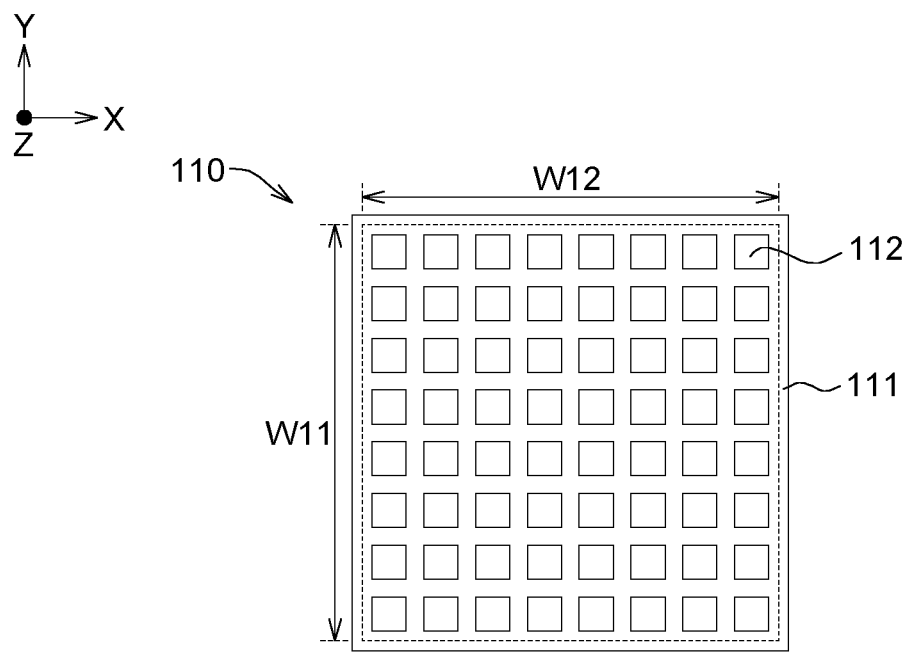
FIG. 1C is a schematic diagram of a matric-type light source of FIG. 1A.
Figure 1D:
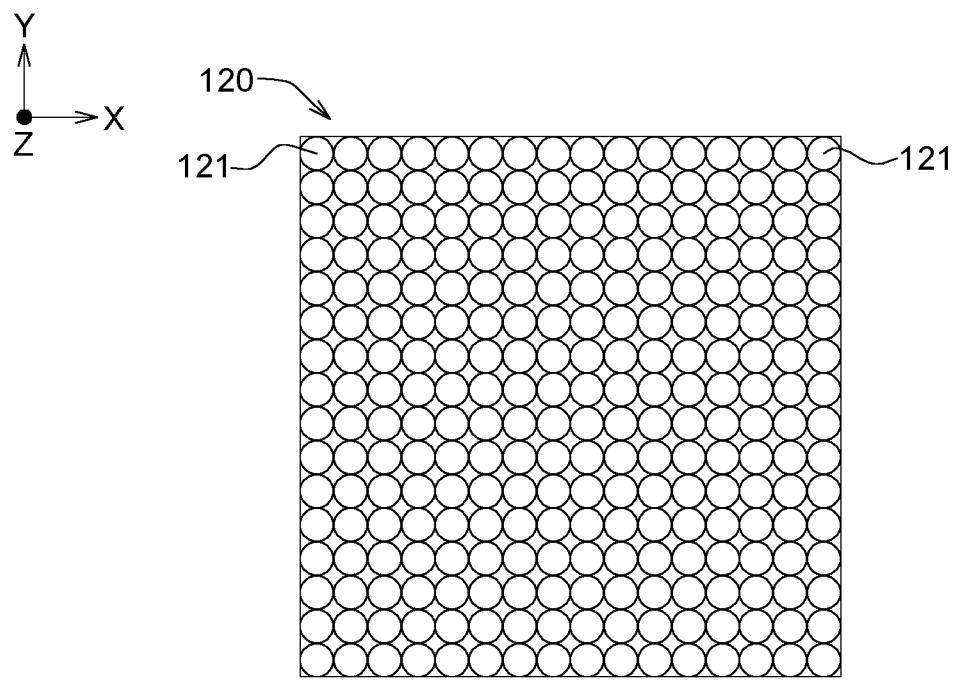
FIG. 1D is a schematic diagram of a microlens array of FIG. 1A.

Referring to FIGS. 1A-1D, FIGS. 1A and 1B are schematic diagrams of a pattern projection device 100 according to an embodiment of the present invention, and FIG. 1C is a schematic diagram of a matric-type light source 110 of FIG. 1A, and FIG. 1D is a schematic diagram of a microlens array 120 of FIG. 1A.

The pattern projection device 100 includes a matric-type light source 110, a microlens array 120 and an imaging lens 130.

The matric-type light source 110 may emit a first light beam L1 having a first length-width ratio and having at least one pattern. The microlens array 120 is located in an optical path between the matric-type light source 110 and the imaging lens 130. The imaging lens 130 is located downstream of the optical path of the matric-type light source 110. The imaging lens 130 includes at least a lens 133 having a refractive power and an anamorphic optical element 131. The number of the lens 133 may be one or more. The lens 133 may be disposed at an optical path between the light source 110 and the asymmetric optical element 131, or the asymmetric optical element 131 may be disposed at an optical path between the light source 110 and the lens 133. The first light beam L1 passing through the asymmetrical optical element 131 become the second light beam L2, wherein the second light beam L2 has a second length-width ratio different from the first length-width ratio. In other words, the imaging lens 130 can change the length-width ratio of the emitting light of the matric-type light source 110 such that the second length-width ratio of the second light beam L2 is not limited by the length-width ratio of the matric-type light source 110.

Figure 9:
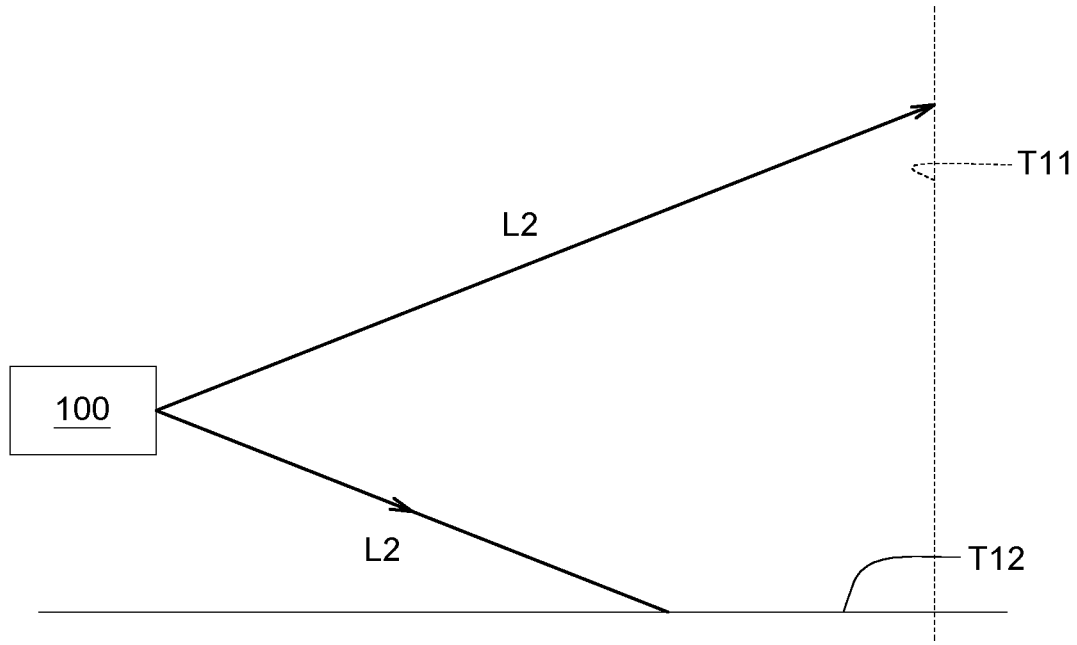
FIG. 9 is a schematic diagram of the pattern projection device projecting the second light beam according to another embodiment of the present invention.

As shown in FIGS. 1A to 1C, the matric-type light source 110 includes a substrate 111 and a plurality of light-emitting elements 112. The light-emitting element 112 is disposed on the substrate 111. The first length-width ratio is, for example, a ratio (W11/W12) of a first length W11 and a second length W12 of the distribution area of the light-emitting elements 112. The second length-width ratio is, for example, a ratio (W21/W22) of a third length W21 and a fourth length W22 of a projection area of the second light beam L2 projected on the imaging plane T1. The imaging plane T1 of FIG. 1A is illustrated as an example perpendicular to an optical axis. Depending on the practical use of the pattern projection device 100, the imaging plane T1 of FIG. 9 is composed of a first imaging plane T11 and a second imaging plane T12. The second imaging plane T12 may be a road surface, and the second light beam emitted by the pattern projection device 100 may simultaneously illuminate the first imaging plane T11 and the second imaging plane T12 for illuminating the road surface and the front road condition. The length-width ratios of the part of the second light beam L2 illuminating the first imaging plane T11 and the second imaging plane T12 are equal to or less than 0.5 respectively.

In addition, in the present embodiment, each light-emitting element 112 is, for example, a self-luminous element. In this case, the matric-type light source 110 does not require a backlight module. In one embodiment, the light-emitting element 112 is, for example, a micro light-emitting diode (micro LED). The micro LED may have a size range between about 1 micrometer and about 10 micrometers by microlithographic manufacturing process, and all micro LEDs can be disposed on the substrate 111 by massive transfer technique and then packaged into a single micro LED chip having a size of less than 100 micrometers. Like the organic light emitting diode (OLED), each pixel (for example, a micro LED) of the micro LED chip of can be individually addressed, and the light is driven to emit light separately (self-luminous). In comparison with OLED, Micro LED is more energy efficient and has faster response. In another embodiment, the light-emitting element 112 is, for example, a Mini LED, and the Mini LED has a size ranging between about 100 microns and about 200 microns. However, according to the classification of the Epistar Corp., general LED has size ranging between about 200 micrometers and about 300 micrometers, and mini LED has size ranging between about 50 micrometers and about 60 micrometers, while Micro LEDs has size ranging between about 15 micrometers. Thus, the size is for assist classification of LED, not for unique classification of LED. Actually, LED may be classified according to whether the LED is self-luminous and LED production technology.

In an embodiment, a number of light-emitting elements 112 are independently controlled to emit light, such that some of the light-emitting elements 112 emit light, while others may not emit light, causing the first light beam L1 to present a pattern. In other words, the matric-type light source 110 can emit a first light beam L1 (image light) having a pattern with the first length-width ratio, and the second light beam L2 (image light) having a pattern with a second length-width ratio different from the first length-width ratio. Furthermore, the pattern of the first light beam L1 can be changed by controlling several light-emitting elements 112. In other embodiments, the light-emitting elements 112 can simultaneously emit color light having different light colors (different color temperatures), and each light-emitting element 112 can emit a number of different color lights such as red light, blue light, green light and white light. Alternatively, all light-emitting elements 112 can emit color light having single light color with different gray level, such as white light or color light having any color temperature.

In summary, the pattern projection device 100 of the embodiment of the present invention can emit the first light beam L1 having pattern by using the same matric-type light source 110. In an embodiment, the pattern of the first light beam L1 is the same as the pattern of the second light beam L2, but they are different in length-width ratio. Furthermore, the content of the aforementioned patterns is variable. In another embodiment, the aforementioned pattern may present color (multiple light colors), but may also present single color with a number of gray-levels, such as white light or other color temperature light colors.

Due to the light-emitting element 112 of the matric-type light source 110 can emit a patterned light beam, as shown in FIGS. 1A and 1B, the matric-type light source 110 itself can emit image light, and thus optical path between the matric-type light source 110 and the imaging lens 130 may not be provided with any light valve, but the embodiment of the invention is not limited thereto. In addition, as can be seen from FIGS. 1A and 1B, the optical path between the matric-type light source 110 and the imaging lens 130 of the pattern projection device 100 of the present embodiment may not be provided with a conventional light combining module or a light combining element.

In addition, as shown in FIG. 1C, a number of light-emitting elements 112 are arranged in a matrix of n×m, where n and m are positive integers equal to or greater than 1, the sum of n and m is greater than 2, and n and m can be equal or different. In one embodiment, n and m can range between 1 and 1,000,000, such as several, tens, hundreds, thousands, tens of thousands or hundreds of thousands, etc., or even more. As a result, the resolution of the pattern of the first light beam L1 can be increased and/or the first light beam L1 can be provided with more pattern changes.

As shown in FIG. 1D, the microlens array 120 includes a plurality of microlens structures 121. The microlens structure 121 can condense the first light beam L1 such that most or the whole of the concentrated first light beam L1' is incident on the imaging lens 130. In another embodiment, the pattern projection device 100 may omit the microlens array 120. In this case, after the first light beam L1 is emitted from the matric-type light source 110, it may be directly projected to the imaging lens 130 without passing through any physical optical element. However, embodiments of the invention are not limited thereto.

As shown in FIGS. 1A and 1B, in the present embodiment, the anamorphic optical element 131 is exemplified by a cylindrical lens. In particular, the cylindrical lens has no refractive power in a first direction (e.g., along the Y-axis) and has a refractive power in a second direction (e.g., along the X-axis), wherein the first direction is substantially perpendicular to the second direction. Thus, the cylindrical lens can maintain the length of the first light beam L1' in the first direction, but enlarge the length of the first light beam L1' in the second direction, such that the second length-width ratio of the second light beam L2 and the first length-width ratio of the first light beam L1 are different. In another embodiment, the cylindrical lens of FIGS. 1A and 1B can also be rotated by 90 degrees, such that the cylindrical lens does not have refractive power in the first direction (e.g., along the X-axis), but have refractive power along the second direction (e.g., along the Y-axis).

Figure 2A:
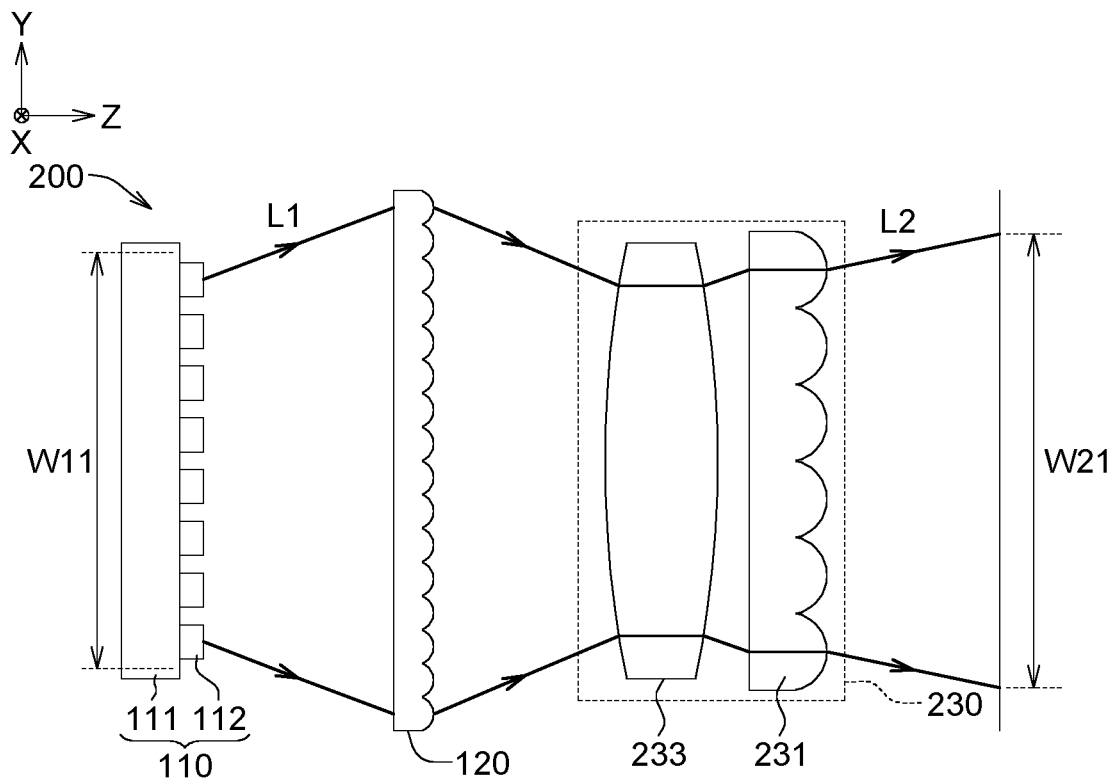
FIGS. 2A-2B are schematic diagrams of a pattern projection device according to another embodiment of the present invention.
Figure 2B:
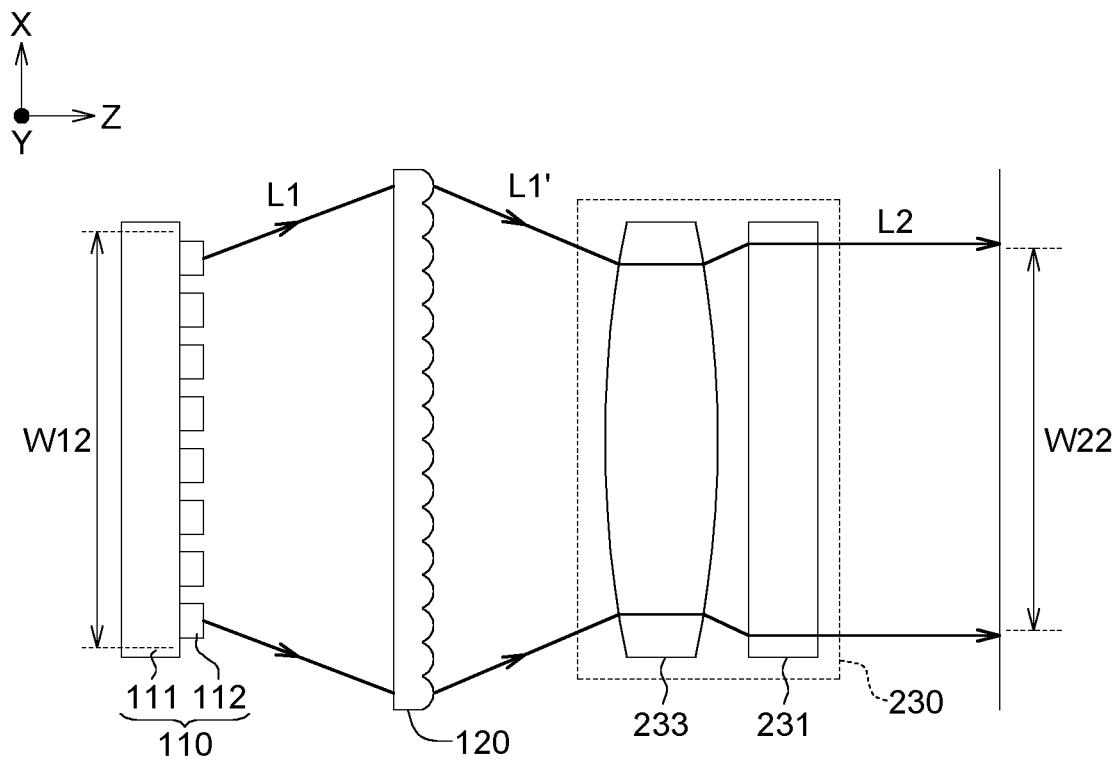

Referring to FIGS. 2A-2B, schematic diagrams of a pattern projection device 200 according to another embodiment of the present invention are shown.

The pattern projection device 200 includes the matric-type light source 110, the microlens array 120 (optionally) and an imaging lens 230. The imaging lens 230 includes a lens 233 having refractive power and an asymmetrical optical element 231, and the number of the lens 233 is one or more. In the present embodiment, the asymmetric optical element 231 is a lenticular lens which can provide a technical effect similar to the aforementioned cylindrical lens on changing the length-width ratio of the first light beam L1.

As shown in FIGS. 2A and 2B, the lenticular lens has no refractive power in the first direction (e.g., along the X-axis), and has refractive power in the second direction (e.g., along the Y-axis), wherein the first direction and the second direction are substantially vertical. As such, the lenticular lens can maintain the length of the first light beam L1' in the first direction, but enlarge the length of the first light beam L1' in the second direction, such that the second length-width ratio of the second light beam L2 and the first length-width ratio of the first light beam L1 are different. In another embodiment, the lenticular lens of FIGS. 2A and 2B can also be rotated by 90 degrees. Thus, the lenticular lens has no refractive power in the first direction (e.g., along the Y axis) and has refractive power in the second direction. (e.g., along the X axis).

Figure 3A:
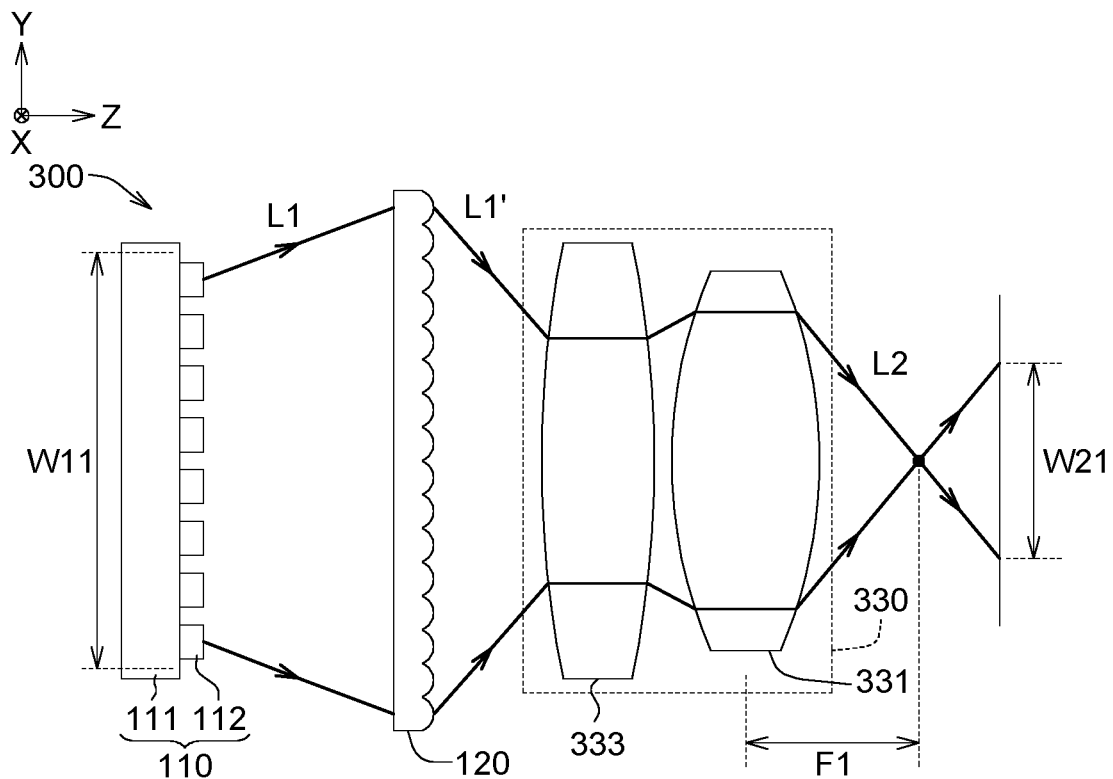
FIGS. 3A-3B are schematic diagrams of a pattern projection device according to another embodiment of the present invention.
Figure 3B:
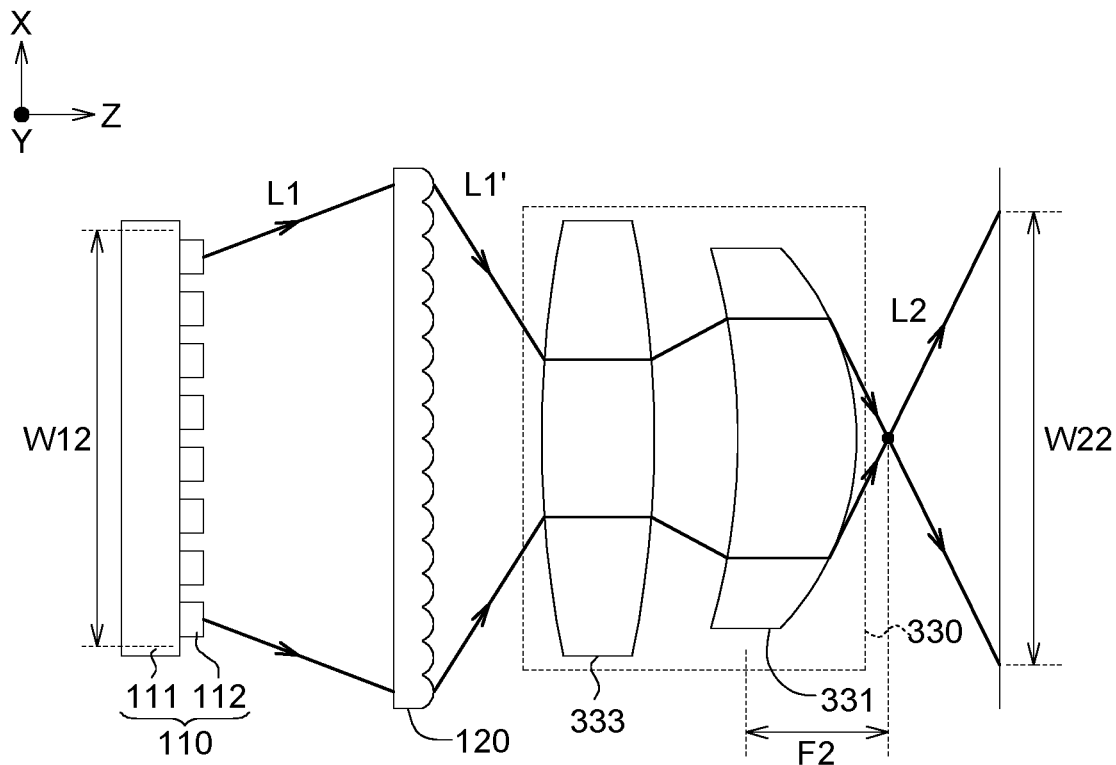

Referring to FIGS. 3A-3B, schematic diagrams of a pattern projection device 300 according to another embodiment of the present invention is shown.

The pattern projection device 300 includes the matric-type light source 110, the microlens array 120 (optionally) and an imaging lens 330. The imaging lens 330 includes an asymmetric optical element 331 and a lens 333 having refractive power, wherein the number of the lens 333 may be one or more. In the present embodiment, the asymmetric optical element 331 is a biconic lens which provides a technical effect similar to the aforementioned cylindrical lens and lenticular lens on changing the length-width ratio of the first light beam L1'.

As shown in FIGS. 3A and 3B, the biconic lens has a first refractive power in a first direction (e.g., along the Y-axis) and has a second refractive power in a second direction (e.g., along the X-axis), wherein the first refractive power is different from the second refractive power. Due to the first refractive power being different from the second refractive power, the biconic lens makes the first focal length F1 of the second light beam L2 which passes through the biconic lens in the first direction and the second focal length F2 of the second light beam L2 which passes through the biconic lens in the second direction different, thereby making the second length-width ratio of the second light beam L2 and the first length-width ratio of the first light beam L1' different. In another embodiment, the biconic lenses of FIGS. 3A and 3B may also be rotated by 90 degrees, such that the biconic lens have the refractive powers in along the first direction (e.g., along the X axis) and the second direction (e.g., along the Y axis).

Figure 4:
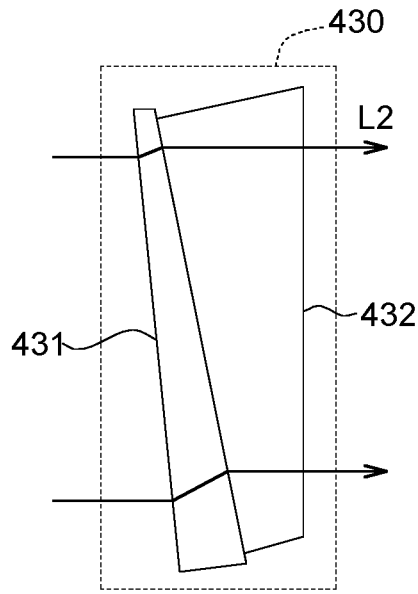
FIGS. 4-6 are schematic diagrams of an asymmetric optical element according to other embodiments of the present invention.
Figure 5:
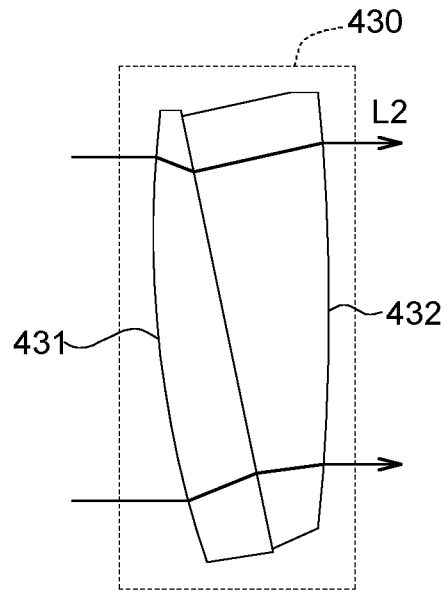
Figure 6:
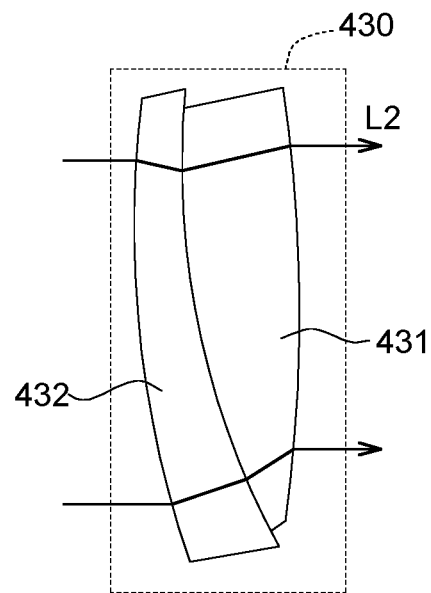

Referring to FIGS. 4-6, schematic diagrams of an asymmetric optical element according to other embodiments of the present invention are shown. The asymmetrical optical element of the aforementioned imaging lens 130, 230 or 330 may be replaced by an asymmetrical optical element 430. In the present embodiments, the asymmetric optical element 430 may include at least two lenses, for example, a first lens 431 and a second lens 432. The first lens 431 is, for example, a wedge plate, a wedge lens or a lens having a refracting power, and the second lens 432 is, for example, a wedge plate, a wedge lens or a lens having a refracting power. By the combination of the first lens 431 and the second lens 432, the pattern of the second light beam L2 can be deformed (the second light beam L2 has the length-width ratio different from that of the first light beam L1 (not shown)) and can compensate for the dispersion. The length-width ratio of the second light beam L2 is changed by the optical path difference of the aforementioned wedge plate or wedge lens. In addition, the aforementioned lens having refractive power is, for example, the aforementioned asymmetrical optical element 131, 231, 331 or other lens having a plane, a spherical surface, an aspheric surface or a curved surface having other curvatures.

The embodiment of the present invention does not limit the type of the asymmetric optical element included in the imaging lens, except for the cylindrical lens, the biconic lens, the lenticular lens and the wedge lens, single lens, a combination of a plurality of lenses, a mirror, a single wedge plate, a combination of a plurality of wedge plates or a combination of a wedge plate and a lens which can change the length-width ratio of the first light beam L1 can be used as the asymmetric optical element of the embodiment of the present invention.

Figure 7:
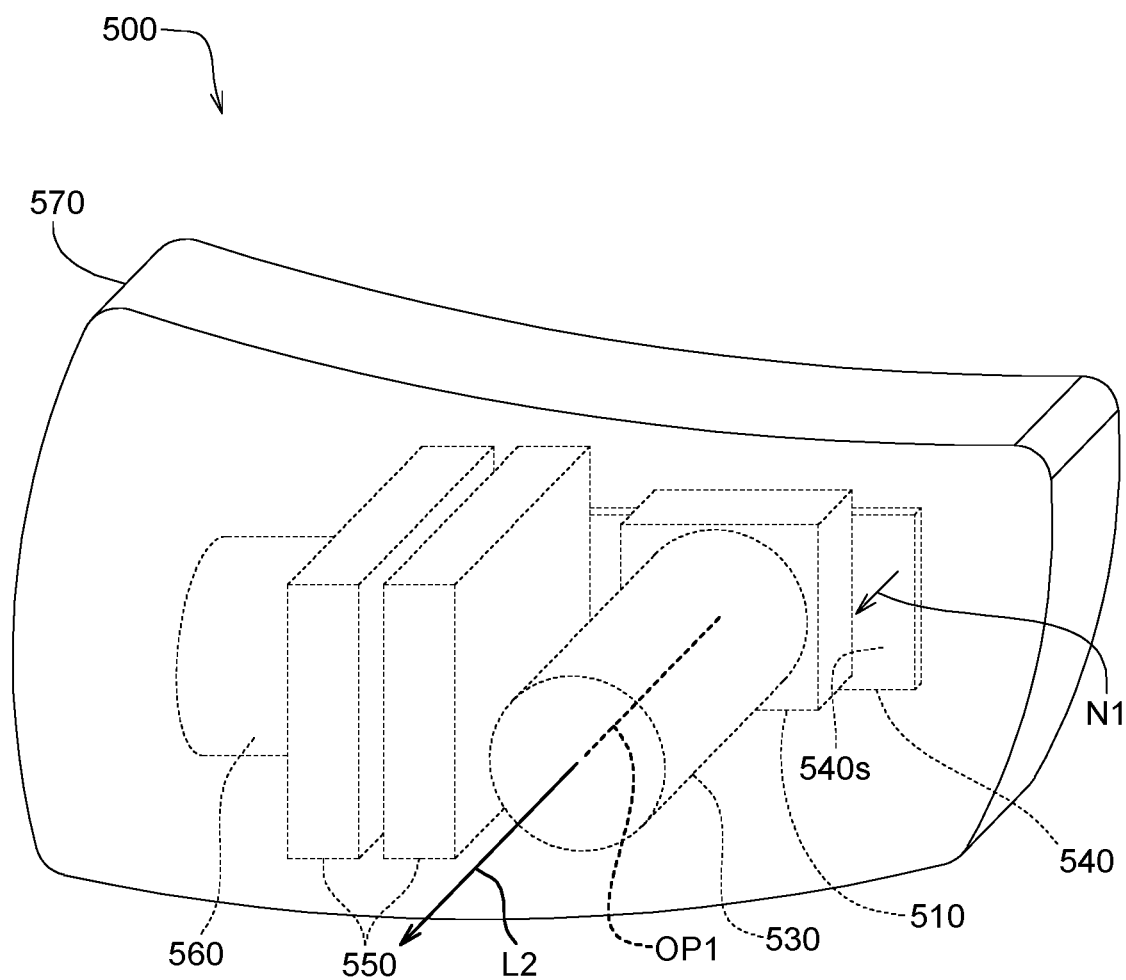
FIGS. 7 and 8 are schematic diagrams of a pattern projection device according to another embodiment of the present invention.
Figure 8:
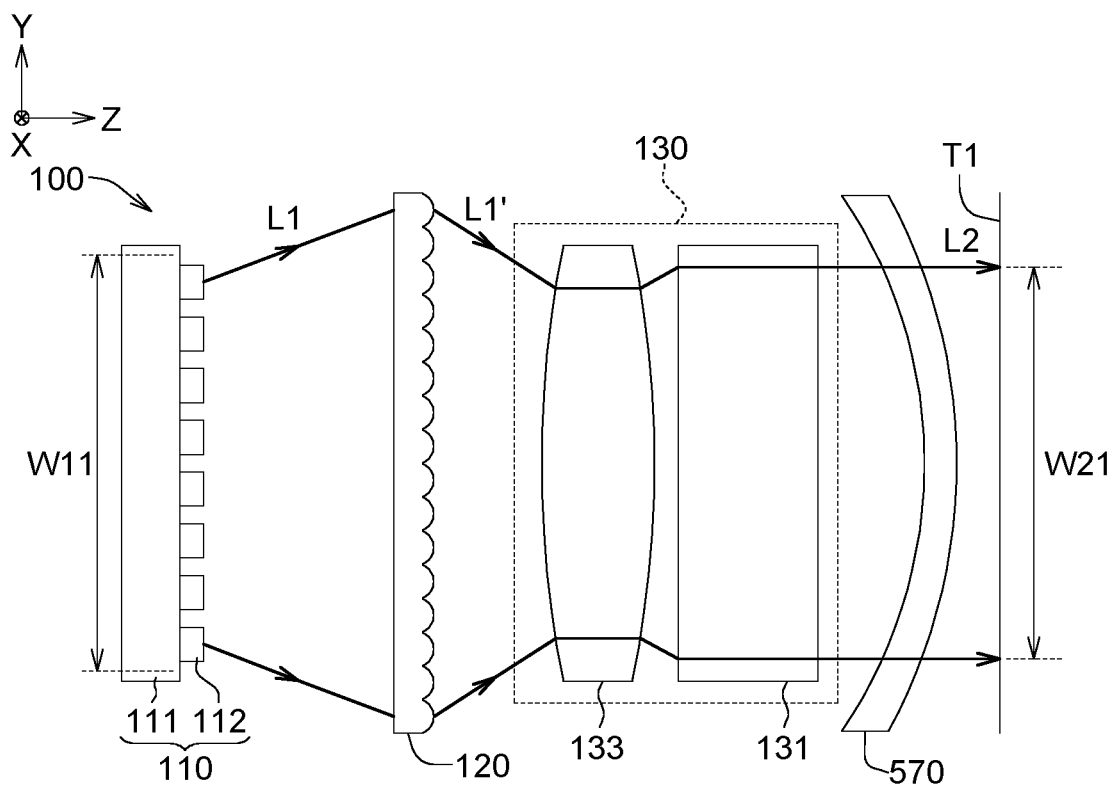

Referring to FIGS. 7 and 8, schematic diagrams of a pattern projection device 500 according to another embodiment of the present invention are shown. The pattern projection device 500 is exemplified by a vehicle lampshade applied to transportation. However, the pattern projection device of the embodiment of the present invention can be applied to other optical products that require illumination or projection patterns according to actual needs, and is not limited to application to a lampshade product.

The pattern projection device 500 includes a light source housing 510, the aforementioned matric-type light source 110, a microlens array 120, a lens barrel 530, the aforementioned imaging lenses 130, 230 and 330, a circuit board 540, a heat sink 550, a fan 560, and a lampshade 570. In another embodiment, if not required, the pattern projection device 500 can also selectively omit at least one of the light source housing 510, the lens barrel 530, the circuit board 540, the heat sink 550, the fan 560 and the lampshade 570.

The matric-type light source 110 is disposed within the light source housing 510 to be protected by the light source housing 510 and to avoid light leakage. The imaging lens (130, 230 or 330) is disposed within the lens barrel 530 to be protected by the lens barrel 530. In the present embodiment, the matric-type light source 110 is disposed and electrically connected to the circuit board 540, so that an external signal (not shown) can control the illumination mode of the matric-type light source 110 through the circuit board 540. The heat generated by the matric-type light source 110 can be conducted to the heat sink 550 through a heat pipe (not shown). The fan 560 can dissipate the heat of the heat sink 550 out of the pattern projection device 500. The lampshade 570 can cover the light source housing 510, the matric-type light source 110, the microlens array 120, the lens barrel 530, the imaging lens (130, 230 or 330), the circuit board 540, the heat dissipation fins 550 and the fan 560 to protect these components. In another embodiment, two or more sets of pattern projection modules can be disposed in the lampshade 570. One set of pattern projection modules includes the light source housing 510, the matric-type light source 110, the microlens array 120, the lens barrel 530, and the imaging lens (130, 230 or 330), the circuit board 540, the heat sink fins 550 and the fan 560.

The lampshade 570 allows the second light beam L2 to pass through to be away from the lampshade 570. The second light beam L2 emitted from the lampshade 570 can be projected onto a road surface or a distant object. As shown in FIG. 9, the second length-width ratio of the second light beam L2 refers to the length-width ratio of the first imaging plane or the second imaging plane of the second light beam L2 exiting the lampshade 570 and then projected onto the road surface or the distant object. The ratio of the second length-width ratio is, for example, 0.5 or less.

As shown in FIG. 7, the matric-type light source 110 is disposed on a surface 540s of the circuit board 540, and a normal direction N1 of the surface 540s is substantially parallel to an optical axis OP1 of the matric-type light source 110.

In addition, although not shown, the pattern projection device 500 may further include a power board electrically connected to the circuit board 540 for transmitting power (the power supplied from, for example, power source outside the pattern projection device 500) to the circuit board 540. In another embodiment, the power board can be disposed outside the pattern projection device 500 and electrically connected to the circuit board 540 through at least one circuit (not shown) or at least one trace (not shown).

As shown in the pattern projection device of the embodiment of the present invention, the matric-type light source itself can emit the imaging light having the pattern without the light valve, and the image light having the first length-width ratio passes through the asymmetric optical element. The first length-width ratio of the image light is changed to a second light beam having a second length-width ratio to provide a desired (or expected) change of the length-width ratio.

While the invention has been described by example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pattern projection device for transportation vehicle, comprising:
    a matric-type light source comprising a plurality of light-emitting elements configured to emit an image light with a pattern;
    an imaging lens located downstream of optical path of the matric-type light source and comprising:
        a lens having a refractive power; and
        an anamorphic optical element; and
    a vehicle lampshade located downstream of optical path of the anamorphic optical element;
    wherein the anamorphic optical element is selected from group consisting of a cylindrical lens, a biconic lens, a lenticular lens, a wedge lens, a wedge plate, and a combination thereof.

2. The pattern projection device according to claim 1, wherein there is no light valve in optical path between the matric-type light source and the imaging lens.

3. The pattern projection device according to claim 1, wherein the light-emitting elements are arranged in a matrix of n×m, wherein n and m are positive integers ranging between 1 and 1000000.

4. The pattern projection device according to claim 1, wherein the light-emitting elements are configured to emit color light with different light colors.

5. The pattern projection device according to claim 1, wherein the light-emitting elements are configured to emit color light with the same light color.

6. The pattern projection device according to claim 1, wherein the anamorphic optical element satisfy one of the following conditions: (1) the anamorphic optical element has a first refractive power along a first direction and a second refractive power along a second direction, the first refractive power being different from the second refractive power, the first direction being substantially perpendicular to the second direction (2) having no refractive power in a first direction and having a refractive power in a second direction, the first direction being substantially perpendicular to the second direction; (3) the asymmetric optical element further comprising a mirror.

7. The pattern projection device according to claim 1, wherein the first light beam emitted by the matric-type light source is directly projected to the imaging lens.

8. The pattern projection device according to claim 1, further comprises:
    a circuit board having a surface;
    a matric-type light source disposed on the surface of the circuit board, wherein a normal direction of the surface is substantially parallel to optical axis of the matric-type light source.

9. The pattern projection device according to claim 1, further comprises:
    a microlens array disposed on optical path between the matric-type light source and the imaging lens.

10. A pattern projection device for transportation vehicle, comprising:
    a matric-type light source configured to emit a first light beam having a pattern and comprising a plurality of self-luminous light-emitting elements;
    an imaging lens located downstream of optical path of the matric-type light source and at least comprising a lens having a refractive power and an anamorphic optical element, wherein the anamorphic optical element is selected from the group consisting of a cylindrical lens, a biconic lens, a lenticular lens, a wedge lens, a wedge plate, and a combination thereof;
    wherein the first light beam passing through the imaging lens becomes a second light beam, and the second light beam has a length-width ratio less than or equal to 0.5 in an imaging plane.

11. The pattern projection device according to claim 10, wherein there is no light valve in optical path between the matric-type light source and the imaging lens.

12. The pattern projection device according to claim 10, wherein the light-emitting elements are arranged in a matrix of n×m, wherein n and m are positive integers ranging between 1 and 1000000.

13. The pattern projection device according to claim 10, wherein the light-emitting elements satisfy one of the following conditions: (1) the light-emitting elements are configured to emit color light with different light colors; (2) the light-emitting elements are configured to emit color light with the same light color.

14. The pattern projection device according to claim 10, wherein the anamorphic optical element has a first refractive power along a first direction and a second refractive power along a second direction, the first refractive power being different from the second refractive power, the first direction being substantially perpendicular to the second direction.

15. The pattern projection device according to claim 10, wherein the anamorphic optical element has no refractive power in a first direction and having a refractive power in a second direction, the first direction being substantially perpendicular to the second direction.

16. The pattern projection device according to claim 10, wherein the asymmetric optical element further comprises a mirror.

17. The pattern projection device according to claim 10, wherein the first light beam emitted by the matric-type light source is directly projected to the imaging lens.

18. The pattern projection device according to claim 10, further comprises:
    a circuit board having a surface;
    a matric-type light source disposed on the surface of the circuit board, wherein a normal direction of the surface is substantially parallel to optical axis of the matric-type light source.

19. The pattern projection device according to claim 10, further comprises:
   a microlens array disposed on optical path between the matric-type light source and the imaging lens.

* * * * *